(12) United States Patent
Jiang et al.

(10) Patent No.: US 9,267,068 B1
(45) Date of Patent: Feb. 23, 2016

(54) PROTECTING AGENT COMPOSITION FOR HIGH/ULTRA-HIGH PERMEABILITY RESERVOIRS AND DRILLING FLUID AND USE THEREOF

(71) Applicant: China University of Petroleum (Beijing), Beijing—Changping District (CN)

(72) Inventors: Guancheng Jiang, Beijing (CN); Yang Xuan, Beijing (CN); Xi Wang, Beijing (CN); Shuo Zhang, Beijing (CN); Yuxiu An, Beijing (CN); Jinsheng Sun, Beijing (CN)

(73) Assignee: China University of Petroleum (Beijing) (CN)

( * ) Notice: Subject to any disclaimer, the term of this patent is extended or adjusted under 35 U.S.C. 154(b) by 0 days.

(21) Appl. No.: 14/860,411

(22) Filed: Sep. 21, 2015

(30) Foreign Application Priority Data

Feb. 11, 2015 (CN) .......................... 2015 1 0073306

(51) Int. Cl.
*C09K 8/12* (2006.01)
*C09K 8/03* (2006.01)
*E21B 3/00* (2006.01)

(52) U.S. Cl.
CPC . *C09K 8/03* (2013.01); *C09K 8/032* (2013.01); *E21B 3/00* (2013.01)

(58) Field of Classification Search
None
See application file for complete search history.

(56) References Cited

U.S. PATENT DOCUMENTS

| | | | | |
|---|---|---|---|---|
| 4,486,316 A * | 12/1984 | Carriere | ................... | C09K 8/24 507/119 |
| 4,806,164 A * | 2/1989 | Brothers | ................. | C04B 24/20 166/285 |
| 4,959,432 A * | 9/1990 | Fan | ....................... | C08F 220/34 526/287 |
| 5,039,433 A * | 8/1991 | Sopko | ................... | C08F 120/58 507/121 |
| 6,196,317 B1 * | 3/2001 | Hardy | ................... | C09K 8/512 166/270 |
| 7,284,611 B2 * | 10/2007 | Reddy | ...................... | C09K 8/16 166/292 |
| 2009/0221452 A1 * | 9/2009 | Whitfill | ................... | C09K 8/03 507/104 |
| 2013/0324443 A1 * | 12/2013 | Wang | ................... | C04B 24/163 507/121 |
| 2014/0038857 A1 * | 2/2014 | Miller | .................... | C09L 8/035 507/104 |
| 2014/0315763 A1 * | 10/2014 | Kakadjian | ............. | C09K 8/035 507/115 |

FOREIGN PATENT DOCUMENTS

| | | |
|---|---|---|
| CN | 101311243 A | 11/2008 |
| CN | 102127400 A | 7/2011 |
| CN | 102399542 A | 4/2012 |
| CN | 103484094 A | 1/2014 |
| EP | 1902115 B1 | 3/2008 |

OTHER PUBLICATIONS

First Office Action from Chinese Patent Application No. 201510073306.4 dated Aug. 5, 2015.

* cited by examiner

*Primary Examiner* — Alicia Bland
(74) *Attorney, Agent, or Firm* — Calfee, Halter & Griswold LLP

(57) ABSTRACT

The present subject matter relates to a protecting agent composition for high/ultra-high permeability reservoirs, consisting of a protecting agent and a filler, wherein, the filler comprises calcium carbonate of 600-1,000 mesh, calcium carbonate of 300-590 mesh, and calcium carbonate of 50-200 mesh at 1:(1-30):(0-40) weight ratio, and the protecting agent comprises structural units denoted by the following formulae (1), (2), and (3). The present subject matter further provides a drilling fluid containing the above-mentioned composition. The present subject matter further provides a use of the drilling fluid for drilling in high/ultra-high permeability reservoirs. The drilling fluid provided in the present subject matter has advantages including easy use, high environmental friendliness, and outstanding reservoir protection, greatly reduces the damages of drilling fluid to high/ultra-high permeability reservoirs, and brings substantial economic benefits.

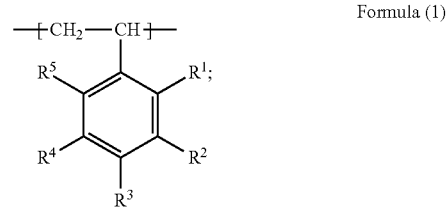

Formula (1)

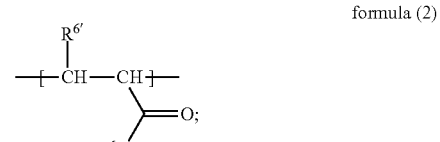

formula (2)

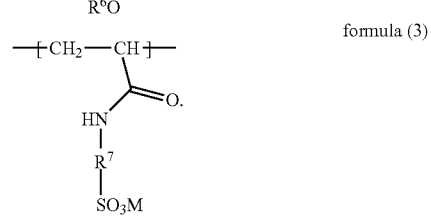

formula (3)

18 Claims, No Drawings

US 9,267,068 B1

PROTECTING AGENT COMPOSITION FOR HIGH/ULTRA-HIGH PERMEABILITY RESERVOIRS AND DRILLING FLUID AND USE THEREOF

CROSS REFERENCE TO RELATED APPLICATIONS

This application claims priority to Chinese Patent Application No. 201510073306.4 filed on Feb. 11, 2015 and entitled "Protecting agent composition for high/ultra-high permeability reservoirs and drilling fluid and use thereof", the entire content amount of which is fully incorporated here by reference.

FIELD OF THE INVENTION

The present invention relates to a protecting agent composition for high/ultra-high permeability reservoirs and drilling fluid and use thereof.

BACKGROUND OF THE INVENTION

Drilling fluids are reputed as the blood for bore wells. Good drilling fluid techniques are one of the important guarantees for safe, high-quality, efficient, and quick well drilling production. Drilling fluids are required in the development of oil fields.

Effective reservoir protection is an effective guarantee for improving the rate of oil and gas recovery, so that the skin factor can be an optimal negative value. If the drilling fluid is designed or used inappropriately in the well drilling process, the liquid and solid in the drilling fluid may intrude into the oil reservoir and have physical and chemical reactions with clay and other minerals in the oil and gas layer. Consequently, the permeability in the oil layer in the immediate vicinity of the well may be decreased severely, and the resistance against air and gas flow towards the bottom of the well may be increased, resulting in reduced oil yield. The injuries to the reservoir have critical impacts on low-permeability reservoirs and unnegligible damages to high-permeability reservoirs.

Usually, the permeability of high/ultra-high permeability reservoirs is 500 mD (milli Darcy) or above. For high permeability reservoirs, the permeability can be 500-2,000 mD; for ultra-high permeability reservoirs, the permeability can be 2,000 mD or above. For high/ultra-high permeability reservoirs, since the permeability is high, the solid particles in the drilling fluid may enter into the pores and pore throats in the reservoir more easily, resulting in severely decreased permeability; in addition, the drilling fluid may intrude into the reservoir more deeply owing to the high permeability, resulting in damages such as clay expanding, dispersion and migration, and water blocking, and having impacts on the accuracy of well logging; especially, it will be more difficult to drain off the drilling fluid if the foreign fluid in the drilling fluid has physical and chemical reactions with the reservoir fluid or reservoir rock; consequently, the oil and gas resources in the reservoir may be contaminated.

In the drilling process, the drilling fluid may intrude the high/ultra-high permeability reservoir easily and thereby cause damages to the reservoirs and it is difficult to recover from such damages. Such damages to the reservoir have drawn attention widely in the petroleum industry in worldwide. As the exploration is developed further, the problem becomes more and more prominent.

It is proven in field tests that the above problem can't be solved by conventional drilling fluid systems. Hence, it is especially important to develop new drilling fluid additives and reservoir protective drilling fluid techniques to meet the current challenge of complex geological conditions. Up to now, though long-time researches on reservoir protective drilling fluid techniques have been made in worldwide, and techniques such as shielded temporary plugging technique, fractal geometry-based temporary plugging technique, $D_{90}$ ideal temporary plugging technique, broad-spectrum temporary plugging technique, Alkali soluble micrometer-level cellulose temporary plugging technique, $D_{50}$ temporary plugging technique, filming technique, oil film technique, etc., have been developed, the protective effect of these techniques is not ideal for high/ultra-high permeability reservoirs. Hence, it is urgent task to develop a novel drilling fluid system that has enhanced plugging performance and is suitable for high/ultra-high permeability reservoirs.

The existing drilling fluids have properties that can essentially meet the requirement for cuttings carrying and well wall stability, but don't provide an ideal reservoir protection effect, and the core permeability recovery value of the reservoir is low. Though temporary plugging agents are added in these drilling fluids, the plugging performance is not high because the structural characteristics of high/ultra-high permeability reservoirs are not taken into consideration fully. Consequently, the filtrate may intrude into the reservoir and thereby results in damages such as water sensitivity and water blocking, etc. Therefore, a novel drilling fluid system that can protect high/ultra-high permeability reservoirs should be developed. The reservoir protection problem in the drilling progress of high/ultra-high permeability reservoirs has been a focus in the oil exploration and development work.

SUMMARY OF THE INVENTION

The present application discloses a protecting agent composition for high/ultra-high permeability reservoirs and drilling fluid and use thereof.

DETAILED DESCRIPTION

Hereunder some embodiments of the present subject matter will be detailed. It should be appreciated that the embodiments described here are only provided to describe and explain the present subject matter, but shall not be deemed as constituting any limitation to the present subject matter.

To overcome the above mentioned drawbacks existing in drilling fluids for high/ultra-high permeability reservoirs in the prior art, the present subject matter provides a protecting agent composition for high/ultra-high permeability reservoirs and drilling fluid and use thereof, which are especially ideal for high/ultra-high permeability reservoirs and have high reservoir protection performance.

To attain the object described above, the present subject matter provides a protecting agent consisting of a protecting agent and a filler, wherein, the filler comprises calcium carbonate of 600-1,000 mesh, calcium carbonate of 300-590 mesh, and calcium carbonate of 50-200 mesh in a weight ratio of 1:(1-30):(0-40), and the protecting agent comprises structural units denoted by the following formula (1), formula (2), and formula (3):

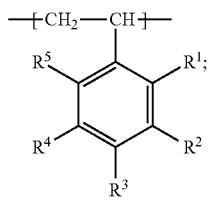

formula (1)

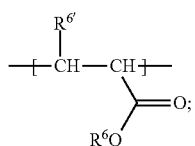

formula (2)

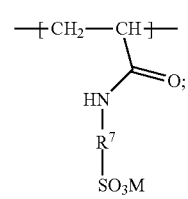

formula (3)

wherein, $R^1$, $R^2$, $R^3$, $R^4$ and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal element; a molar ratio of the structural unit denoted by formula (1):the structural unit denoted by formula (2):the structural unit denoted by formula (3) is 1:0.2-1.5:0.1-1.2; and a weight-average molecular weight of the protecting agent is 70,000-85,000 g/mol.

The present subject matter further provides a drilling fluid containing the protecting agent composition for high/ultra-high permeability reservoirs.

The present subject matter further provides an use of the drilling fluid for drilling in high/ultra-high permeability reservoirs.

By utilizing the protecting agent composition for high/ultra-high permeability reservoirs as a protecting agent for drilling fluid, the drilling fluid according to the present subject matter exhibits favorable rheology property, temperature tolerance, collapse prevention property and protection performance when used for drilling in high/ultra-high permeability reservoirs.

Other aspects and advantages of the present subject matter will be further detailed in the embodiments hereunder. The present subject matter provides a protecting agent composition for high/ultra-high permeability reservoirs, consisting of a protecting agent and a filler, wherein, the filler comprises calcium carbonate of 600-1,000 mesh, calcium carbonate of 300-590 mesh, and calcium carbonate of 50-200 mesh in a weight ratio of 1:(1-30):(0-40); the protecting agent comprises structural units denoted by the following formula (1), formula (2), and formula (3):

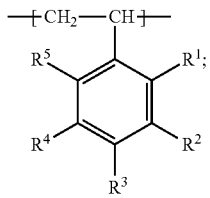

formula (1)

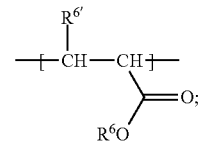

formula (2)

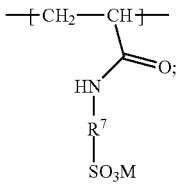

formula (3)

wherein, $R^1$, $R^2$, $R^3$, $R^4$ and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal element; molar ratio of the structural unit denoted by formula (1):the structural unit denoted by formula (2):the structural unit denoted by formula (3) is 1:0.2-1.5:0.1-1.2; weight-average molecular weight of the protecting agent is 70,000-85,000 g/mol.

According to the present subject matter, for high/ultra-high permeability reservoirs, in which the pores and pore throats are large and the permeability is high, the drilling fluid may intrude into the reservoir more easily; especially, the solid particles in the drilling fluid may result in severely decreased permeability in the reservoir in immediate vicinity of the well wall, the liquid phase in the drilling fluid may permeate farther into the interior of the reservoir and cause damages such as water sensitivity and alkaline sensitivity, etc. As the damaged zone is enlarged, the yield of the oil and gas well may be reduced, and even it is difficult to produce oil and gas from the reservoir. To avoid the occurrence of such problems, through research, the inventor has found: when the protecting agent composition consisting of a protecting agent and a filler according to the present subject matter is used as a reservoir protective component in a drilling fluid, a polymer film can be formed on the rock of well wall in the well drilling process, and the polymer film can work with the special filler to form an outer well wall plugging layer that has an excellent plugging effect. Thus, the permeation of the drilling fluid into the reservoir can be greatly reduced, and various problems incurred by permeation can be avoided. To give a better play to the plugging effect of the protecting agent composition according to the present subject matter, preferably the filler comprises calcium carbonate of 800-1,000 mesh, calcium carbonate of 300-500 mesh, and calcium carbonate of 100-200 mesh in a weight ratio of 1:(4-25):(6-28).

In an embodiment of the present subject matter, for reservoirs with 500-2,000 mD permeability, the filler comprises calcium carbonate of 800-900 mesh, calcium carbonate of 300-400 mesh, and calcium carbonate of 50-100 mesh in a weight ratio of 1:(1-10):(5-10).

In another embodiment of the present subject matter, for reservoirs with permeability of 2,000 mD or above, the filler comprises calcium carbonate of 800-1,000 mesh, calcium carbonate of 300-500 mesh, and calcium carbonate of 100-200 mesh in a weight ratio of 1:(20-25):(22-30).

According to the present subject matter, the protecting agent can work with the filler to form a polymer film on reservoir rock. The protecting agent is an amphiphilic polymer, which contains hydrophilic sulfonate groups and a large quantity of benzene rings and hydrophobic acrylate groups. When the amphiphilic polymer serving as the protecting agent is used with the filler together in the drilling fluid for well drilling, the strongly hydrophilic sulfonate groups will attach to the surface of the clay, so that hydrated film on surface of the clay is thickened, and thereby diffused electric doublet layer on the surface of the clay is enhanced, and flocculation or agglomeration of the clay incurred by high temperature and high-salinity electrolytes can be effectively prevented. Hence, the protecting agent can endow the drilling fluid with outstanding temperature tolerance, salinity tolerance, and filter loss reduction properties. In addition, the hydrophilic sulfonate groups can attach to the surface of reservoir rock and overlying clay shale, while the hydrophobic groups extend outward from the rock surface; thus, a hydrophobic film can be formed on the rock surface. The hydrophobicity can inhibit the permeation of free water in the drilling fluid into the reservoir rock and clay shale. Thus, on one hand, the reservoir is protected against the damages from the drilling fluid; on the other hand, the hydrated expansion and dispersion of the clay shale can be inhibited.

According to the present subject matter, to obtain a polymer serving as a protecting agent for drilling fluid with higher performance, preferably, in the structural units denoted by formulae (1), (2), and (3), which constitute the protecting agent, $R^1$, $R^2$, $R^3$, $R^4$, and $R^5$ independently are H, $C_1$-$C_3$ alkyl or $C_1$-$C_3$ alkoxyl. More preferably, $R^1$, $R^2$, $R^3$, $R^4$, and $R^5$ independently are H, methyl, ethyl, methoxyl or ethyoxyl; further more preferably, $R^1$, $R^2$, $R^3$, $R^4$, and $R^5$ independently are H, methyl or ethyl.

According to the present subject matter, $R^6$ preferably is $C_1$-$C_4$ alkyl, and more preferably is methyl, ethyl, n-propyl, iso-propyl, n-butyl, iso-butyl or tert-butyl.

According to the present subject matter, $R^{6'}$ preferably is H, methyl or ethyl, and more preferably is H or methyl.

According to the present subject matter, $R^7$ preferably is $C_2$-$C_{10}$ alkyl, more preferably is $C_2$-$C_8$ alkyl, further more preferably is $C_2$-$C_7$ alkyl, still further more preferably is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$— or —$CH_2$—$CHCH_3$—$CH_2$—, and particularly preferably is —$C(CH_3)_2$—$CH_2$—.

According to the present subject matter, M preferably is H, Na, K or Li, and more preferably is H or Na.

In another embodiment of the present subject matter, in the structural units denoted by formulae (1), (2), and (3), which constitute the amphiphilic polymer, $R^1$, $R^2$, $R^3$, $R^4$, and $R^5$ are H, $R^6$ is n-butyl, $R^{6'}$ is H, and $R^7$ is —$C(CH_3)_2$—$CH_2$—.

In another embodiment of the present subject matter, in the structural units denoted by formulae (1), (2), and (3), which constitute the amphiphilic polymer, $R^1$, $R^2$, $R^4$, and $R^5$ are H, $R^3$ is methyl, $R^6$ is ethyl, $R^{6'}$ is H, and $R^7$ is —$C(CH_3)_2$—$CH_2$—.

In another embodiment of the present subject matter, in the structural units denoted by formulae (1), (2), and (3), which constitute the amphiphilic polymer, $R^1$, $R^2$, $R^3$, $R^4$, and $R^5$ are H, $R^6$ is methyl, $R^{6'}$ is H, and $R^7$ is —$C(CH_3)_2$—$CH_2$—.

In another embodiment, the weight-average molecular weight of the protecting agent is 75,000-85,000 g/mol.

In another embodiment, the molecular weight distribution coefficient Mw/Mn of the protecting agent is 1.1-1.3.

According to the present subject matter, to balance the effect of the hydrophobic end and the effect of the hydrophilic end in the amphiphilic polymer and enhance the cooperation between the protecting agent and the filler to attain the objective of reservoir plugging, preferably, in the protecting agent, the molar ratio of the structural units denoted by formula (1): the structural units denoted by formula (2):the structural units denoted by formula (3) is 1:0.3-1.2:0.1-0.5; more preferably, the molar ratio is 1:0.3-1.2:0.1-0.4.

In order to improve the applicability to protection of high/ultra-high permeability reservoirs, the particle size of the protecting agent in the composition is further optimized in the present subject matter. When the particle size of the protecting agent is 0.6-0.8 μm, the protecting agent can work with the filler in the specific composition according to the present subject matter in a better way in the drilling fluid, to accomplish plugging of the high/ultra-high permeability reservoir.

According to the present subject matter, the protecting agent can be prepared through any conventional polymerization reaction, as long as the obtained protecting agent has the structure and composition characteristics required in the present subject matter. Preferably, the method for preparation of the protecting agent in the present subject matter comprises: mixing a chemical compound represented by formula (4), a chemical compound represented by the formula (5), and a chemical compound represented by formula (6) and an initiator to contact with an emulsifier in water to obtain an emulsified mixture and have a polymerization reaction, wherein molar ratio of the chemical compound represented by formula (4):the chemical compound represented by the formula (5):the chemical compound represented by formula (6) is 1:0.2-1.5:0.1-1.2, conditions of the polymerization reaction ensures the weight-average molecular weight of the obtained polymer is 70,000-85,000 g/mol;

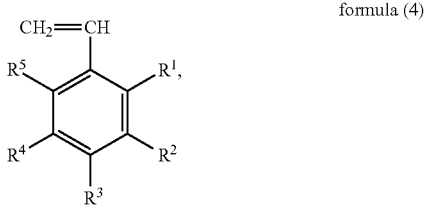

formula (4)

formula (5)

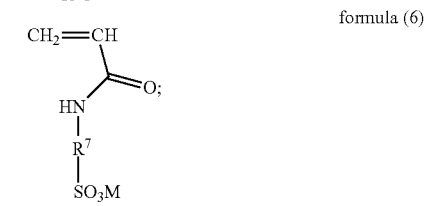

formula (6)

wherein, $R^1$, $R^2$, $R^3$, $R^4$, and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal element.

Wherein, the structural units of the protecting agent depend on the chemical compound represented by formula (4), the chemical compound represented by formula (5), and the chemical compound represented by formula (6); the chemical compound represented by formula (4), the chemical compound represented by formula (5), and the chemical compound represented by formula (6) can be selected according to the desired structure of the protecting agent. Thus, the $R^1$, $R^2$, $R^3$, $R^4$, $R^5$, $R^6$, $R^{6'}$, $R^7$ and M are preferably within the scopes described above.

In another embodiment, the chemical compound represented by formula (4) is one or more of styrene, p-methyl styrene, and p-ethyl styrene.

In another embodiment, the chemical compound represented by formula (5) is one or more of methyl acrylate, ethyl acrylate, butyl acrylate, butyl methacrylate, and propyl methacrylate.

In another embodiment, the chemical compound represented by formula (6) is one or more of 2-acrylamide-2-methyl propanesulfonic acid and 2-acrylamide propanesulfonic acid.

In another embodiment, the molar ratio of the chemical compound represented by formula (4):the chemical compound represented by formula (5):the chemical compound represented by formula (6) is 1:0.3-1.2:0.1-0.5; further more preferably, the molar ratio is 1:0.3-1.2:0.1-0.4.

The polymerization reaction among the chemical compound represented by formula (4), the chemical compound represented by formula (5), and the chemical compound represented by formula (6) is an emulsion polymerization reaction actually. Hence, an emulsifier must be added in the polymerization reaction. To enable the above monomers to have a reaction among them more uniformly and more completely, in the present subject matter, preferably the chemical compound represented by formula (4), the chemical compound represented by formula (5), and the chemical compound represented by formula (6) are mixed with water to form a mixture, and then an emulsifier is added into the mixture to obtain an emulsified mixture.

Wherein, based on the total weight of the emulsified mixture, the total content amount of the chemical compound represented by formula (4), the chemical compound represented by formula (5), and the chemical compound represented by formula (6) preferably is 44-70 wt. %. More preferably, the content amount of the chemical compound represented by formula (4) is 20-30 wt. %. More preferably, the content amount of the chemical compound represented by formula (5) is 10-25 wt. %. More preferably, the content amount of the chemical compound represented by formula (6) is 5-18 wt. %.

There is no particular restriction on the emulsifier in the present subject matter, as long as the chemical compound represented by formula (4), the chemical compound represented by formula (5), and the chemical compound represented by formula (6) are controlled to have an emulsion polymerization reaction with the method disclosed in the present subject matter and the protecting agent according to the present subject matter is obtained. Preferably, based on the total weight of the chemical compound represented by formula (4), the chemical compound represented by formula (5), and the chemical compound represented by formula (6), the concentration of the emulsifier is 5-6 wt. %. More preferably, the emulsifier is one or more of sodium dodecyl benzene sulfonate, sodium dodecyl sulfate, and sodium diisopropyl naphthalene sulfonate.

The concentration of the initiator can vary in a wide range, as long as the protecting agent according to the present subject matter can be obtained. Preferably, based on the total weight of the chemical compound represented by formula (4), the chemical compound represented by formula (5), and the chemical compound represented by formula (6), the concentration of the initiator is 0.6-1.1 wt. %. More preferably, the initiator is one or more of azodiisobutyronitrile, dilauroyl peroxide, potassium persulfate, ammonium persulfate, benzoyl peroxide, and hydrogen peroxide.

In view of the high activity of the initiator, in the present subject matter, an inactive gas can be fed into the reaction system to expel oxygen in the reaction system and thereby keep the polymerization reaction in inert atmosphere before the polymerization reaction, wherein, the inactive gas is a gas that will not participate in the polymerization reaction and can expel oxygen, such as nitrogen, helium, or neon, etc. The inactive gas can be fed for 25-50 min., for example.

Likewise, to control the reaction rate of the polymerization reaction, preferably the emulsified mixture is heated up to 60-70° C. before the inactive gas is fed; then, the initiator can be added, and the polymerization reaction can be started.

According to the present subject matter, preferably, the conditions of the polymerization reaction include: temperature is 70-85° C., time is 6-8 h. Through a polymerization reaction under such conditions, a protecting agent that is especially suitable for the composition in the present subject matter can be obtained.

The protecting agent according to the present subject matter can be obtained after the polymerization reaction. To extract the protecting agent, the resultant mixed solution can be cooled after the polymerization reaction is completed, and the pH of the resultant mixed solution can be adjusted to 8.5-10 with 20-30 wt. % of water solution of an alkali metal hydroxide (e.g., water solution of sodium hydroxide, or water solution of potassium hydroxide, etc.) to obtain a precipitate; then, the precipitate can be separated from the mixed solution and dried at 95-105° C., so as to obtain a solid protecting agent, which can be used as the protecting agent for drilling fluid in the present subject matter.

According to the present subject matter, preferably, the weight ratio of the protecting agent to the filler is 100:100-200.

The present subject matter further provides a drilling fluid, which contains the protecting agent composition described above.

To give a better play to the reservoir plugging and protection effect of the protecting agent composition in the drilling process of high/ultra-high permeability reservoir, preferably, the content amount of the protecting agent composition is 2-3 wt. % in the drilling fluid.

There is no particular restriction on the drilling fluid system that contains the protecting agent composition in the present subject matter. In other words, the drilling fluid system can be any conventional drilling fluid system in the art, as long as the protecting agent composition according to the present subject matter is added into the conventional drilling fluid system. As such a conventional drilling fluid system, for example, the drilling fluid can be one or more of potassium chloride-poly alcohol drilling fluid, organosilicon drilling fluid, and cationic drilling fluid. The potassium chloride-poly alcohol drilling fluid can be any potassium chloride-poly alcohol drilling fluid well known to those skilled in the art; for example, it can be one or more of potassium chloride-polyethylene glycol drilling fluid, potassium chloride-polypropylene glycol drilling fluid, potassium chloride-ethylene glycol/propylene glycol copolymer drilling fluid, potassium chloride-polyglycerol drilling fluid and potassium chloride-polyvinyl glycol drilling fluid. The organosilicon drilling fluid can be any organosilicon drilling fluid well known to those skilled in the art, and the organosilicon in the organosilicon drilling fluid can be selected from one or more of sodium methylsiliconate, potassium methylsiliconate, and silicone-potanssium humate. The cationic drilling fluid can be any cationic drilling fluid well known to those skilled in the art; for example, the cations in the cationic drilling fluid can be selected from one or more of 2,3-epoxypropyl trimethyl ammonium chloride, 3-chloro-2-hydroxypropyl trimethyl ammonium chloride, and cationic polyacrylamide.

In another embodiment, the drilling fluid according to the present subject matter further contains one or more of bentonite, tackifier, diluent, filtrate reducer, anti-collapse agent, xanthan gum, and alkali metal hydroxide.

Wherein, the bentonite refers to clay which contains montmorillonite as the main mineral component and can endow the drilling fluid with viscous shearing force and filtration and wall building properties. For example, the bentonite can be sodium bentonite and/or calcium bentonite, preferably sodium bentonite. More preferably, the content amount of the bentonite is 2-4 wt. %, more preferably 2-3 wt. %.

Wherein, the tackifier can improve the viscous shearing force of the drilling fluid. For example, the tackifier can be one or more of potassium polyacrylamide (KPAM), polyanionic cellulose (e.g., PAC141, PAC-HV), and polyacrylamide (PAM). Preferably, the content amount of the tackifier is 0.6-2 wt. %, more preferably 1-1.5 wt. %.

Wherein, the diluent can decrease the viscosity of the drilling fluid, adjust the flow pattern of the drilling fluid, and improve the shear-thinning property of the drilling fluid. For example, the diluent can be sulfonated sodium tannin (SMT). Preferably, the content amount of the diluent is 1-2 wt. %.

Wherein, the filtrate reducer can improve the filtration and wall building properties of the drilling fluid. For example, the filtrate reducer can be one or more of sulfomethylated phenolic resin (e.g., SMP-1, SMP-II), lignite resin (e.g., KFT), sulfomethylated lignite resin (e.g., SPNH), and zwitterionic polymer JT-888, and preferably is JT-888. Preferably, the content amount of the filtrate reducer 1-8 wt. %, more preferably is 2-4 wt. %.

Wherein, the anti-collapse agent can prevent collapse of the well wall and improve the stability of the well wall. For example, the anti-collapse agent can be one or more of potassium humate (KHM), organosilicon (e.g., GF-1), and modified asphalt (e.g., FT-1A, FT-301). Preferably, the content amount of the anti-collapse agent is 2-4 wt. %.

The above additives can be commercially available products, or can be prepared with conventional methods in the art. They will not be further detailed herein.

In the drilling fluid according to the present subject matter, preferably, the content amount of xanthan gum is 0.02-0.06 wt. %. Preferably, the content amount of the alkali metal hydroxide is 0.1-0.4 wt. %, more preferably 0.1-0.2 wt. % (as a component of the drilling fluid, the alkali metal hydroxide can improve the mud-making performance of the bentonite, and can be one or more of sodium hydroxide, potassium hydroxide, and lithium hydroxide, and preferably is potassium hydroxide).

In another embodiment of the present subject matter, a drilling fluid is provided. The drilling fluid contains 1-3 wt. % of protecting agent composition, 2-3 wt. % of bentonite, 1-1.5 wt. % of tackifier (comprising KPAM, PAC-HV and PAM at 1:0.5-1:0.5-1 weight ratio), 1-2 wt. % of SMT, 2-4 wt. % of KFT, 2-4 wt. % of FT-301, 0.02-0.06 wt. % of xanthan gum, and 0.1-0.2 wt. % of potassium hydroxide.

The present subject matter further provides an use of the drilling fluid for drilling in high/ultra-high permeability reservoirs.

When the drilling fluid is used in well drilling in high/ultra-high permeability reservoirs, it can form a better plugging layer on the well wall to prevent permeation of the drilling fluid into the reservoir.

Hereunder the present subject matter will be further detailed in some embodiments.

In the following examples, the weight-average molecular weight is measured with a gel permeation chromatograph (GPC) (GPC Model E2695 from Waters Company (a USA company)); the molecular weight distribution coefficient is the ratio of the weight-average molecular weight to the number-average molecular weight measured with the GPC.

Preparation Example 1

Add styrene (52 g, 0.5 mol), butyl acrylate (20 g, 0.16 mol) and 2-acrylamide-2-methyl propanesulfonic acid (10 g, 0.05 mol) into 100 mL water to form a primary mixture, add 4.5 g sodium dodecyl benzene sulfonate (from Chengdu Micxy Chemicals Co., Ltd., China, the same below) to obtain an emulsified mixture, feed nitrogen for 30 min into the emulsified mixture, then heat up the emulsified mixture to 65° C. and add 0.09 g ammonium persulfate into it, and then further heat up the emulsified mixture to 70° C. and keep it at the temperature for reaction for 6 h; after the reaction is completed, cool down the reaction solution to 30° C., add 20 wt. % of water solution of sodium hydroxide to adjust pH to 8.5, and then add 4 mL methanol and stir to obtain a precipitate; dry the obtained precipitate at 100° C. and grind it into powder; thus, 73 g solid protecting agent A1 (yellowish powder) in 0.65-0.75 μm particle size is obtained, which is the protecting agent described in the present subject matter. The weight-average molecular weight of the protecting agent is 83,462 g/mol, and the molecular weight distribution coefficient is 1.2; analyzed by H-NMR spectroscopy and C-NMR spectroscopy, the polymer contains structural units denoted by formula (1), structural units denoted by formula (2), and structural units denoted by formula (3) at 1:0.32:0.1 molar ratio.

Preparation Example 2

Add p-methyl styrene (47.2 g, 0.4 mol), ethyl acrylate (38.4 g, 0.4 mol) and 2-acrylamide-2-methyl propanesulfonic acid (20.7 g, 0.1 mol) into 100 mL water to form a primary mixture, add 5.5 g sodium dodecyl sulfate (from Zibo Jujin Chemicals Co., Ltd., China) to obtain an emulsified mixture, feed nitrogen for 30 min into the emulsified mixture, heat up the emulsified mixture to 70° C. and add 1 g of azodiisobutyronitrile into it, and then further heat up the emulsified mixture to 75° C. and keep it at the temperature for reaction for 7.5 h; after the reaction is completed, cool down the reaction solution to 30° C., add 30 wt. % of water solution of sodium hydroxide to adjust pH to 9.5, and then add 4 mL methanol and stir to obtain a precipitate; dry the obtained precipitate at 100° C. and grind it into powder; thus, 95 g solid protecting agent A2 (yellowish powder) in 0.6-0.7 μm particle size is obtained, which is the protecting agent described in the present subject matter. The weight-average molecular weight of the protecting agent is 80,417 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:1:0.25 molar ratio.

Preparation Example 3

Add styrene (52 g, 0.5 mol), methyl acrylate (51.2 g, 0.6 mol) and 2-acrylamide-2-methyl propanesulfonic acid (41.4 g, 0.2 mol) into 100 mL water to form a primary mixture, add 7.5 g sodium diisopropyl naphthalene sulfonate (from Sichuan Cloud Bird Technology Development Co., Ltd., China) to obtain an emulsified mixture, feed nitrogen for 40 min into the emulsified mixture, heat up the emulsified mixture to 65° C. and add 1.5 g dilauroyl peroxide into it, and then further heat up the emulsified mixture to 70° C. and keep it at the temperature for reaction for 6.5 h; after the reaction is completed, cool down the reaction solution to 40° C., add 25 wt. % of water solution of sodium hydroxide to adjust pH to 9, and then add 3.5 mL methanol and stir to obtain a precipitate; dry the obtained precipitate at 100° C. and grind it into powder; thus, 121 g solid protecting agent A3 (yellowish powder) in 0.6-0.7 μm particle size is obtained, which is the protecting agent described in the present subject matter. The weight-average molecular weight of the protecting agent is 75,347 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:1.2:0.4 molar ratio.

Comparative Preparation Example 1

Add styrene (62.4 g, 0.6 mol), butyl acrylate (38.4 g, 0.3 mol) and 2-acrylamide-2-methyl propanesulfonic acid (41.4 g, 0.2 mol) into 100 mL water to form a primary mixture, add 6.5 g sodium dodecyl benzene sulfonate to obtain an emulsified mixture, feed nitrogen for 30 min into the emulsified mixture, heat up the emulsified mixture to 65° C. and add 0.8 g ammonium persulfate into it, and then further heat up the emulsified mixture to 75° C. and keep it at the temperature for reaction for 4 h; after the reaction is completed, cool down the reaction solution to 25° C., add 20 wt. % of water solution of sodium hydroxide to adjust pH to 8.5, and then add 10 mL methanol and stir to obtain a precipitate; dry the obtained precipitate at 100° C. and grind it into powder; thus, 134 g amphiphilic solid polymer B1 (yellowish powder) in 0.7-0.8 μm particle size is obtained. The weight-average molecular weight of the amphiphilic solid polymer is 67,325 g/mol, and the molecular weight distribution coefficient is 1.3; analyzed by H-NMR spectroscopy and C-NMR spectroscopy, the polymer contains structural units denoted by formula (1), structural units denoted by formula (2), and structural units denoted by formula (3) at 1:0.5:0.3 molar ratio.

Comparative Preparation Example 2

Add styrene (52 g, 0.5 mol), butyl acrylate (51.2 g, 0.4 mol) and 2-acrylamide-2-methyl propanesulfonic acid (62.1 g, 0.3 mol) into 100 mL water to form a primary mixture, add 10.5 g sodium dodecyl benzene sulfonate to obtain an emulsified mixture, feed nitrogen for 30 min into the emulsified mixture, heat up the emulsified mixture to 60° C. and add 2 g ammonium persulfate into it, and then further heat up the emulsified mixture to 85° C. and keep it at the temperature for reaction for 8.5 h; after the reaction is completed, cool down the reaction solution to 25° C., add 20 wt. % of water solution of sodium hydroxide to adjust pH to 9, and then add 10 mL methanol and stir to obtain a precipitate; dry the obtained precipitate at 100° C. and grind it into powder; thus, 152 g amphiphilic solid polymer B2 (yellowish powder) in 0.6-0.8 μm particle size is obtained. The weight-average molecular weight of the protecting agent is 88,246 g/mol; analyzed by H-NMR spectroscopy and C-NMR spectroscopy, the polymer contains structural units denoted by formula (1), structural units denoted by formula (2), and structural units denoted by formula (3) at 1:0.8:0.6 molar ratio.

Examples 1-3

These examples are provided here to describe the protecting agent composition and drilling fluid according to the present subject matter. Prepare drilling fluids Y1-Y3 with the following formulation: 3.5 wt. % of protecting agent composition (see Table 1 for the composition), 3 wt. % of sodium bentonite (from Anyang Yihe Bentonite Co., Ltd., China), 0.5 wt. % of KPAM (potassium polyacrylate from Shandong Yanggu Jiangbei Chemicals Co., Ltd., China), 0.3 wt. % of PAC-HV (polyanionic cellulose from Shandong Yanggu Jiangbei Chemicals Co., Ltd., China), 0.3 wt. % of PAM (polyacrylamide from Shandong Yanggu Jiangbei Chemicals Co., Ltd., China), 1 wt. % of SMT (sulfonated sodium tannin from Shandong Yanggu Jiangbei Chemicals Co., Ltd., China), 2.5 wt. % of KFT (lignite resin from Shandong Yanggu Jiangbei Chemicals Co., Ltd., China), 2 wt. % of FT-301 (modified asphalt from Shandong Yanggu Jiangbei Chemicals Co., Ltd., China), 0.05 wt. % of xanthan gum (from Renqiu Jiafu Chemicals Co., Ltd., China), 0.2 wt. % of KOH, and water (the remaining content amount).

Example 4

Prepare drilling fluid Y4 with the following formulation: 3 wt. % of protecting agent composition (see Table 1 for the composition), 3 wt. % of sodium bentonite (from Anyang Yihe Bentonite Co., Ltd., China), 1 wt. % of KPAM (potassium polyacrylate from Shandong Yanggu Jiangbei Chemicals Co., Ltd., China), 0.5 wt. % of PAC-HV (polyanionic cellulose from Shandong Yanggu Jiangbei Chemicals Co., Ltd., China), 1 wt. % of CMC (carboxymethyl cellulose from Hebei Silicon Valley Chemicals Co., Ltd., China), 0.8 wt. % of SPNH (lignite resin from Shandong Yanggu Jiangbei Chemicals Co., Ltd., China), 1.5 wt. % of MMH (positive charge colloid from Shandong Yanggu Jiangbei Chemicals Co., Ltd., China), 1.5 wt. % of XC (xanthan gum from Shandong Yanggu Jiangbei Chemicals Co., Ltd., China), 1.0 wt. % of RH-3 (lubricant from Shandong Yanggu Jiangbei Chemicals Co., Ltd., China), 0.5 wt. % of FT-1 (modified asphalt from Shandong Yanggu Jiangbei Chemicals Co., Ltd., China), 2 wt. % of KCl, 0.1 wt. % of KOH, and water (the remaining content amount).

Comparative Example 1

Prepare with the method described in example 1, but without adding protecting agent composition, to obtain a drilling fluid DY1.

Comparative Example 2

Prepare with the method described in example 1, but the protecting agent composition does not contain a filler (see Table 1 for the composition), to obtain a drilling fluid DY2.

Comparative Example 3

Prepare with the method described in example 1, but the protecting agent composition does not contain a protecting agent (see Table 1 for the composition), to obtain a drilling fluid DY3.

Comparative Example 4

Prepare with the method described in example 1, but the composition of the protecting agent composition is that shown in Table 1, to obtain a drilling fluid DY4.

Comparative Example 5

Prepare with the method described in example 1, but the composition of the protecting agent composition is that shown in Table 1, to obtain a drilling fluid DY5.

TABLE 1

| Example | Pro-tecting agent | Composition of Filler (Weight Ratio of Calcium Carbonate) | Weight Ratio of Protecting agent to Filler |
|---|---|---|---|
| Example 1 | A1 | 900 mesh:400 mesh:200 mesh = 1:23:26 | 1:1.5 |
| Example 2 | A2 | 800 mesh:300 mesh:100 mesh = 1:9:10 | 1:1 |
| Example 3 | A3 | 1,000 mesh:500 mesh:200 mesh = 1:4:6 | 1:2 |
| Example 4 | A1 | 500 mesh:200 mesh = 1:1.3 | 1:1.5 |
| Comparative example 1 | / | / | / |
| Comparative example 2 | A1 | / | 1:0 |
| Comparative example 3 | / | 900 mesh:400 mesh:200 mesh = 1:23:26 | 0:1 |
| Comparative example 4 | B1 | 900 mesh:400 mesh:200 mesh = 1:23:26 | The same as example 1 |
| Comparative example 5 | B2 | 900 mesh:400 mesh:200 mesh = 1:23:26 | The same as example 1 |

Test Example 1

Rheology property test: take 400 mL above drilling fluids Y1-Y4 and DY1-DY5 respectively, stir for 5 min at a low speed, and then measure the apparent viscosity (AV, mPa·s), plastic viscosity (PV, mPa·s), dynamic shearing force (YP, Pa), 10 s and 10 min static shearing force, and API water loss under moderate pressure (API, FL, mL) of the drilling fluids respectively as per GB/T16783.1-2006. The results are shown in Table 2.

TABLE 2

| Drilling Fluid | AV (mPa·s) | PV (mPa·s) | YP (Pa) | 10 s/10 min (Pa/Pa) | API·FL (mL) |
|---|---|---|---|---|---|
| Y1 | 82 | 50 | 32 | 4/5.5 | 1.2 |
| Y2 | 79 | 52 | 34 | 4.5/5.5 | 0.9 |
| Y3 | 85 | 51 | 31 | 4/6 | 1 |
| Y4 | 83 | 55 | 32 | 4.5/6 | 0.5 |
| DY1 | 85 | 56 | 34 | 4.5/6.5 | 14.2 |
| DY2 | 81 | 53 | 31 | 5.5/6 | 5.6 |
| DY3 | 83 | 49 | 32 | 4/5.5 | 5.2 |
| DY4 | 89 | 52 | 32 | 4.5/6.5 | 3.1 |
| DY5 | 86 | 55 | 36 | 5.5/6 | 3.3 |

It can be seen in Table 2: adding a protecting agent merely or adding a filler merely cannot attain a good reservoir protection effect, wherein, the filter loss under moderate pressure is 5.6 mL and 5.2 mL respectively, which are higher than the value (0.5-1.2 mL) in a drilling fluid system where a synergetic reservoir protection measure is implemented; in the comparative example 1 where no reservoir protection measure is implemented, the filter loss is as high as 14.2 mL, which is much higher than the values in the drilling fluid systems Y1-Y4 where reservoir protection is implemented.

Test Example 2

Temperature tolerance test: take 400 mL above drilling fluids Y1-Y4 and DY1-DY5 respectively, stir for 20 min at a high speed, load the drilling fluids into aging cans and then load the aging cans into a roller furnace and roll for 16 h at 150° C. temperature; then, take out the aging cans and cool down them to room temperature (about 20° C.), stir for 5 min at a high speed, and then measure the apparent viscosity (AV, mPa·s), plastic viscosity (PV, mPa·s), dynamic shearing force (YP, Pa), 10 s and 10 min static shearing force, API water loss under moderate pressure (API, FL, mL), and water loss under high temperature and high pressure (HTHP, FL, mL) of the drilling fluids respectively as per GB/T16783.1-2006. The results are shown in Table 3.

TABLE 3

| Drilling Fluid | AV (mPa.s) | PV (mPa.s) | YP (Pa) | 10 s/10 min (Pa/Pa) | API.FL (mL) | HTHP.FL (mL) |
|---|---|---|---|---|---|---|
| Y1 | 77 | 42 | 34 | 5/6 | 0.5 | 1.1 |
| Y2 | 76 | 41 | 33 | 5.5/6.5 | 0.4 | 1.2 |
| Y3 | 75 | 40 | 32 | 6/7 | 0.5 | 0.9 |
| Y4 | 65 | 42 | 41 | 5.5/6.5 | 0.3 | 0.8 |
| DY1 | 71 | 40 | 36 | 4.5/5.5 | 6.1 | 17.7 |
| DY2 | 68 | 39 | 42 | 5/6 | 3.2 | 8.4 |
| DY3 | 72 | 38 | 43 | 4.5/6.5 | 3.4 | 9.9 |
| DY4 | 65 | 43 | 36 | 5.5/7 | 2.9 | 7.1 |
| DY5 | 73 | 39 | 39 | 4.5/6.5 | 3.1 | 7.3 |

It can be seen in Table 3: adding a protecting agent merely or adding a filler merely can't attain a good reservoir protection effect, wherein, the filter loss under moderate pressure is 3.2 mL and 3.4 mL respectively and the filter loss under high temperature and high pressure are 7.4 mL and 8.9 mL respectively, which are higher than the values (API: 0.5-1.2 ml, HTHP: 0.8-1.2 mL) in a drilling fluid system where a synergetic reservoir protection measure is implemented; in the comparative example 1 where no reservoir protection measure is implemented, the API filter loss is as high as 6.1 mL and the HTHP is as high as 15.7 mL, which are much higher than the values in the drilling fluid systems Y1-Y4 where reservoir protection is implemented.

Test Example 3

Assessment of recovery rate of clay shale: add 350 mL above drilling fluids Y1-Y4 and DY1-DY5 and 50 g dry drill cuttings (6-10 mesh drill cuttings dried at 150° C.) into aging cans respectively, and carry out aging at 120° C. for 16 h; filter the mixtures after aging through a 40 mesh sieve and flush with tap water respectively; dry the drill cuttings after flushing at 105° C., weigh, and calculate the recovery rate of clay shale=weight of dried drill cuttings/initial weight of drill cuttings.

Assessment of linear expansion of clay shale: take rock powder obtained through drying and grinding, and prepare the rock powder into core blocks (press for 5 min at 4 MPa pressure) for assessment; start a M4600 linear expansion tester for clay shale, mount the core blocks in the tester, make zero adjustment, and then pour the drilling fluids Y1-Y4 and DY1-DY5 respectively; start the test, and record the linear expansion (mm) once every 0.5 h; compare with a reference solution (distilled water), and calculate the linear expansion reduction rate=(measured height−initial height)/initial height.

TABLE 4

| Drilling Fluid | Rolling Recovery Rate of Clay Shale (%) | Linear Expansion Reduction Rate of Clay Shale (%) | | | |
|---|---|---|---|---|---|
| | | 2 h | 4 h | 6 h | 8 h |
| Y1 | 85.5 | 81.6 | 75.8 | 73.2 | 73.1 |
| Y2 | 86.5 | 80.2 | 77.2 | 75.2 | 74.1 |
| Y3 | 87.2 | 82.8 | 78.1 | 76.4 | 73.7 |
| Y4 | 89.9 | 80.4 | 77.2 | 75.8 | 73.7 |
| DY1 | 88.3 | 81.1 | 78.2 | 77.5 | 73.4 |
| DY2 | 89.2 | 82.3 | 79.1 | 76.6 | 73.7 |
| DY3 | 87.4 | 83.1 | 81.1 | 78.4 | 74.3 |
| DY4 | 89.3 | 80.3 | 77.3 | 75.4 | 73.8 |
| DY5 | 88.4 | 79.6 | 76.3 | 74.2 | 71.5 |

It can be seen in Table 4: the protecting agent and the filler have little impact on the rolling recovery rate of clay shale and the linear expansion reduction rate of the clay shale. The system has high inhibitive ability and can fully meet the requirement for field application.

Test Example 4

Test the reservoir protection performance of the drilling fluids Y1-Y4 and DY1-DY5 in a JHMD-1 HTHP dynamic filter loss tester as per SYT6540-2002 "Method for Lab Assessment of Drilling and Completion Fluids Damaging Oil Formation". The results are shown in Table 5;

Wherein, the original permeability of the rock core used in the test is the initial value shown in Table 5.

TABLE 5

| Drilling Fluid | Rock Core No. | Permeability to Oil/$10^{-3}$ μm$^2$ | | | Recovery Rate of Permeability/% | |
|---|---|---|---|---|---|---|
| | | Initial Value | After Plugging | Plugging Rate/% | After Damage | After End Face Cutting |
| Y1 | 1 | 590.6 | 45.37 | 92.3 | 92.3 | 94.7 |
| Y2 | 2 | 565.4 | 34.49 | 93.9 | 95.2 | 97.1 |
| Y3 | 3 | 755.2 | 56.92 | 92.5 | 93.2 | 96.1 |
| Y4 | 4 | 810.7 | 43.79 | 94.6 | 96.1 | 98.2 |
| DY1 | 5 | 772.3 | 221.7 | 71.3 | 69.4 | 73.3 |
| DY2 | 6 | 834.2 | 139.3 | 83.3 | 81.7 | 84.1 |
| DY3 | 7 | 965.3 | 172.8 | 82.1 | 83.1 | 85.6 |
| DY4 | 8 | 897.1 | 95.09 | 89.4 | 87.2 | 89.1 |
| DY5 | 9 | 863.6 | 101.04 | 88.3 | 86.1 | 88.2 |

It can be seen in Table 5: The synergetic reservoir protection technique (in Y1-Y4) can effectively improve the rock core plugging rate to 95% or above, which is apparently better than the effect of simplex reservoir protection (in DY2 and DY3, 83.3% and 82.1% respectively), and is apparently better than the effect attained by a conventional drilling fluid system where no reservoir protection technique is applied (in DY1, 71.35%); with the synergetic reservoir protection technique (in Y1-Y4), the permeability can be 94% or above, which is apparently better than those attained by simplex reservoir protection (in DY2 and DY3, 84.1% and 85.6% respectively), is apparently better than that attained by a conventional drilling fluid system where no reservoir protection technique is applied (in DY1, 73.3%), and is better than those attained by drilling fluids that do not utilize the protecting agent disclosed in the present subject matter (in DY4 and DY5, 89.1% and 88.2% respectively).

In summary, it can be concluded that the protecting agent composition disclosed in the present application has an obvious synergetic effect, and can attain a reservoir protective effect better than that attained by using a protecting agent merely or using a filler merely. Hence, when the protecting agent composition disclosed in the present subject matter is used in a drilling fluid, an ideal reservoir protection effect can be obtained, and the recovery rate of reservoir permeability can be improve effectively.

While some preferred embodiments of the present subject matter are described above, the present subject matter is not limited to the details in those embodiments. Those skilled in the art can make modifications and variations to the technical scheme of the present subject matter, without departing from the spirit of the present subject matter. However, all these modifications and variations shall be deemed as falling into the protected domain of the present subject matter.

In addition, it should be noted that the specific technical features described in above embodiments can be combined in any appropriate form, provided that there is no conflict. To avoid unnecessary repetition, the possible combinations are not described specifically in the present subject matter.

Moreover, different embodiments of the present subject matter can be combined freely as required, as long as the combinations don't deviate from the ideal and spirit of the present subject matter. However, such combinations shall also be deemed as falling into the scope disclosed in the present subject matter

What is claimed is:
1. A protecting agent composition for high/ultra-high permeability reservoirs, consisting of a protecting agent and a filler, wherein the filler comprises calcium carbonate of 600-1,000 mesh, calcium carbonate of 300-590 mesh, and calcium carbonate of 50-200 mesh in a weight ratio of 1:(1-30):(0-40); wherein the protecting agent comprises structural units denoted by formula (1), formula (2), and formula (3):

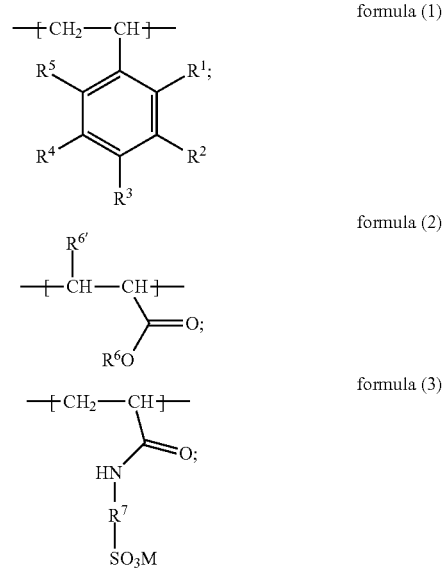

wherein $R^1$, $R^2$, $R^3$, $R^4$ and $R^5$ independently are H, $C_1$-$C_4$ alkyl or $C_1$-$C_4$ alkoxyl; $R^6$ is $C_1$-$C_6$ alkyl; $R^{6'}$ is H or $C_1$-$C_4$ alkyl; $R^7$ is $C_1$-$C_{10}$ alkyl; M is H or an alkali metal element; wherein a molar ratio of the structural unit denoted by formula (1): the structural unit denoted by formula (2): the structural unit denoted by formula (3) is 1:0.2-1.5:0.1-1.2; and wherein a weight-average molecular weight of the protecting agent is 70,000-85,000 g/mol.

2. The composition according to claim 1 wherein a weight ratio of the protecting agent to the filler is 100:100-200.

3. The composition according to claim 1 wherein the filler comprises calcium carbonate of 800-1,000 mesh, calcium carbonate of 300-500 mesh, and calcium carbonate of 100-200 mesh in a weight ratio of 1:(4-25):(6-28).

4. The composition according to claim 1 wherein $R^1$, $R^2$, $R^3$, $R^4$, and $R^5$ independently are H, methyl, ethyl, methoxyl or ethyoxyl.

5. The composition according to claim 4 wherein $R^6$ is methyl, ethyl, n-propyl, iso-propyl, n-butyl, iso-butyl, or tert-butyl.

6. The composition according to claim 4 wherein $R^{6'}$ is H, methyl, or ethyl.

7. The composition according to claim 5 wherein $R^{6'}$ is H, methyl, or ethyl.

8. The composition according to claim 4 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

9. The composition according to claim 5 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

10. The composition according to claim 6 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

11. The composition according to claim 7 wherein $R^7$ is —$CH_2$—$C(CH_3)_2$—$CH_2$—, —$C(CH_3)_2$—$CH_2$—, —$CH_2$—$C(CH_3)_2$—, —$CH_2$—$C(CH_3)_2$—$CH_2$—$CH_2$—, —$CH_2$—$CH_2$—, —$CHCH_3$—$CH_2$—, or —$CH_2$—$CHCH_3$—$CH_2$—.

12. The composition according to claim 4 wherein M is H, Na, K, or Li.

13. The composition according to claim 7 wherein M is H, Na, K, or Li.

14. The composition according to claim 11 wherein M is H, Na, K, or Li.

15. The composition according to claim 1 wherein the weight-average molecular weight of the protecting agent is 75,000-85,000 g/mol.

16. The composition according to claim 1 wherein the particle size of the protecting agent is 0.6-0.8 μm.

17. A drilling fluid containing the protecting agent composition according to claim 1.

18. The drilling fluid according to claim 17 wherein the content amount of the protecting agent composition is present in an amount of 2-3 wt. %.

* * * * *